United States Patent [19]

Mathews

[11] 4,301,351
[45] Nov. 17, 1981

[54] MODULAR MICROPROCESSOR-CONTROLLED CONTROLLER FOR RESISTANCE FOR RESISTANCE WELDING MACHINES

[75] Inventor: James K. Mathews, Van Nuys, Calif.

[73] Assignee: Pertron Controls Corporation, Van Nuys, Calif.

[21] Appl. No.: 29,752

[22] Filed: Apr. 13, 1979

[51] Int. Cl.³ .............................................. B23K 11/24
[52] U.S. Cl. .................................. 219/114; 219/110; 307/252 T; 364/477
[58] Field of Search ............... 219/108, 109, 110, 114; 307/106, 252 T; 364/477

[56] References Cited

U.S. PATENT DOCUMENTS

| | | | |
|---|---|---|---|
| 3,452,214 | 6/1969 | Martin | 219/114 |
| 3,519,917 | 7/1970 | Martin | 219/108 |
| 3,541,429 | 11/1970 | Martin | 219/108 |
| 4,104,724 | 8/1978 | Dix et al. | 364/477 |

*Primary Examiner*—C. C. Shaw
*Attorney, Agent, or Firm*—Keith D. Beecher

[57] ABSTRACT

A precision resistance welding machine controller is provided which may be set to deliver welding power to each of a multiplicity of welding operations on a precisely controlled repeatable basis. The controller of the invention is modular in nature and is microprocessor controlled. The controller includes a master control module which is standard for all models, and the master control module incorporates certain control circuits including a circuit for assuring that an accurately controlled amount of power is delivered for each welding operation. This is achieved by providing precise phase angle control despite variations in line voltage, and line noise disturbances. The controller also includes a personality module which is constructed for a particular welding operation, and which is programmed to incorporate any selected number of steps to be performed in sequence by the welding machine controlled thereby in carrying out the particular welding operation. The duration of each step of the welding machine, and the amount of welding power to be delivered, is set for the particular welding operation by adjustable controls on the personality module. The master control module of the controller of the invention also includes circuitry and controls for providing a self-test capabiliity for the controller. Additional modules may also be added which include, for example, circuitry for providing active feedback of the weld, central plant monitoring, programmable capabilities, and so on.

3 Claims, 14 Drawing Figures

MODULAR MICROPROCESSOR-CONTROLLED CONTROLLER FOR RESISTANCE FOR RESISTANCE WELDING MACHINES

BACKGROUND

Resistance welding processes are widely used in the manufacture of sheet metal assemblies, such as automobile and aircraft bodies. Each resistance weld involves a sequence of electrical energy and mechanical pressure steps. The sequence is provided by a controller which governs the timing of both the electrical and the mechanical steps. For example, the controller may establish a selected number of cycles of A.C. line power at a selected current, with a selected electrode force for each step of a welding operation. In carrying out the welding operation, the operator merely presses a button which sets the controller in operation. The controller then responds to an internal program to carry out all the steps necessary for the operation. The program of the controller is stored in an internal memory, and it may vary from a relatively few commands to a large number of commands, depending upon the simplicity or complexity of the welding operation.

The controller of the invention is controlled by a microprocessor, as mentioned above, which has programmable read-only and random access memories associated therewith. The controller provides heat and pressure commands to the controlled resistance welding machine. The controller includes a digital circuit for compensating for line voltage variations and disturbances, as mentioned above. This circuit digitizes the RMS input voltage and computes the proper firing time to maintain constant power during line voltage fluctuations and disturbances. The firing times are controlled by silicon controlled rectifiers or ignitrons, as will be described. Over-temperature protection of the devices may be provided in the manner described and claimed in U.S. Pat. No. 4,039,928, which is assigned to the present assignee.

SUMMARY

A relatively inexpensive controller for a resistance type welding machine is provided which is modular in nature, and which is microprocessor controlled. The controller includes a master control module which incorporates line voltage compensation, and which is standard for all models, and it also includes a personality module which is programmed to fit the individual customer needs, as well as the needs of various welding operations in the individual customer's plant.

BRIEF DESCRIPTION OF THE DRAWINGS

FIG. 2A is a front elevation.

DETAILED DESCRIPTION OF THE ILLUSTRATED EMBODIMENT

Figure 1:
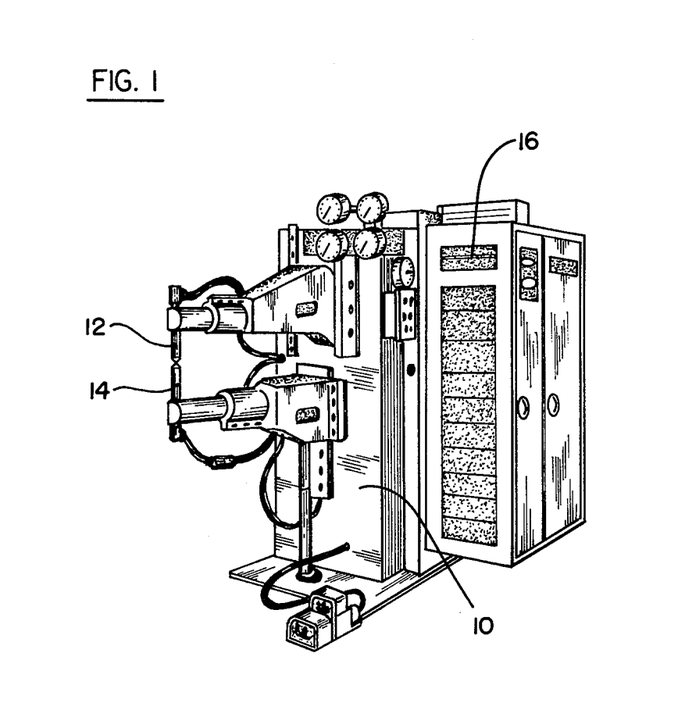
FIG. 1 is a perspective representation showing a typical resistance welding machine controlled by a modular controller constructed in accordance with the concepts of the invention.

As shown in FIG. 1, a typical resistance type welding machine is designated 10. The welding machine 10 includes electrodes 12 and 14 which, when the machine is operated, are squeezed against the opposite sides of the workpiece, and an electric current is then passed through the electrodes and through the workpiece to accomplish the desired weld.

Figure 2A:
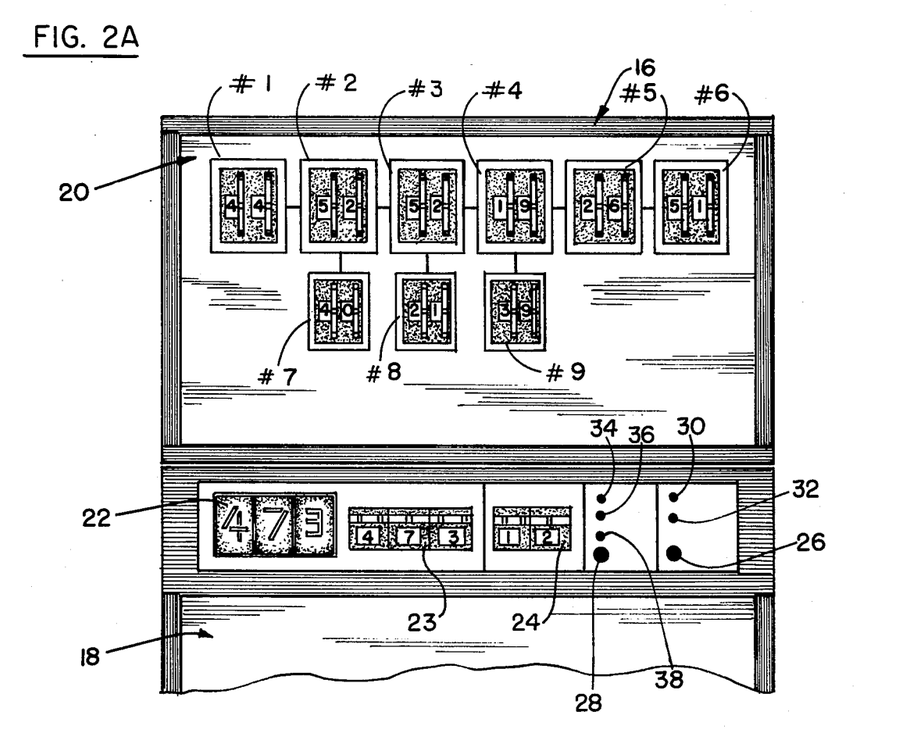
Figure 2B:
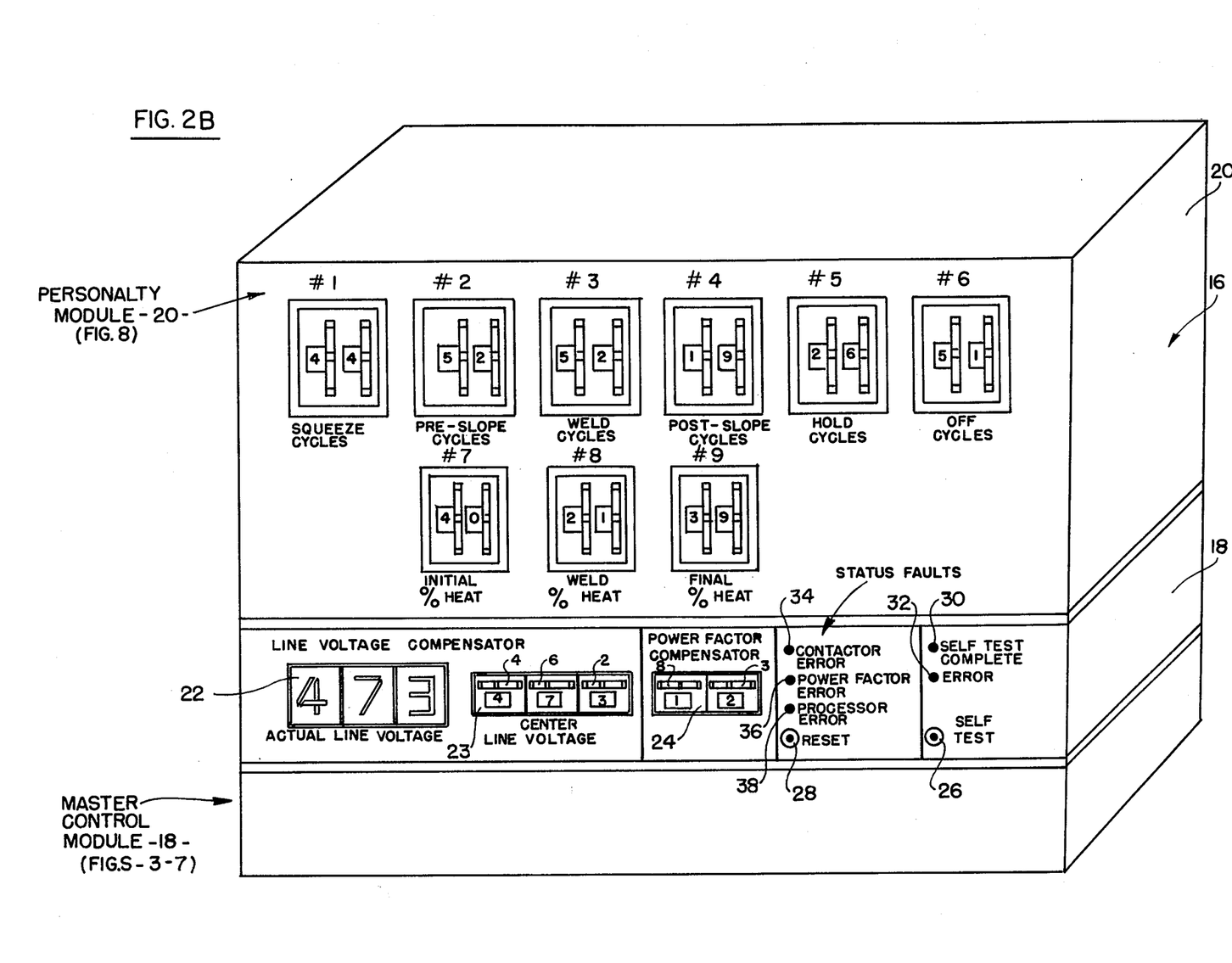
FIG. 2B is a perspective, representation of one embodiment of the controller of the present invention, illustrating the front control panel of the controller.

The movement of the electrodes 12 and 14, and the current flow through the electrodes, are controlled by a controller 16 which is constructed in accordance with the concepts of the present invention. The controller 16, as shown in FIGS. 2A and 2B includes a master control module 18 and a personality module 20.

The personality module 20 includes a series of pairs of thumbwheel switches which are designated #1-#9, in the particular embodiment under consideration, although more or less such switch pairs may be used, depending upon the particular application to which the controller is to be placed. The switch pairs #1-#6 in the illustrated embodiment are used respectively to control the number of cycles of current during the interval in which the electrodes are being squeezed against the opposite sides of the workpiece, to control the number of current cycles prior to the commencement of the actual welding operation, to control the number of current cycles as the actual weld is being formed, to control the number of current cycles after the actual weld has been formed, to control the number of current cycles during a hold operation, and to control the number of current cycles for which an off condition is to occur between successive welding operation. The switch pairs #7, #8, and #9 control the amount of power to be delivered before, during and after the end of the weld during any particular welding operation. Power is linearly increased during a pre-slope interval; it is held constant during the weld interval before the weld is initiated; and it is linearly decreased during a post-slope interval after the weld has been completed.

The master control module 18 includes a three-digit display 22 which designates actual line voltage, together with a series of thumbwheel switches 23 which include individual thumbwheel switches designated 2, 6 and 4 respectively, and which may be adjusted to set a desired center line voltage value. The master control module also includes a further pair of thumbwheel switches 24, which are designated 3 and 8, and which may be set to provide power factor compensation of weld current.

The master control module also includes a self-test pushbutton switch 26 and a reset pushbutton switch 28. A pair of indicator lights 30 and 32, which may be light emitting diodes (LED's), are associated with the self-test pushbutton switch 26, the indicator light 30 being energized when the test procedure is complete, with no errors being encountered; and the LED 32 being energized when an error is encountered during the self-test procedure. Three additional LED's 34, 36 and 38 are provided which are respectively identified as "contactor error", "power factor error" and "processor error".

Figure 3:
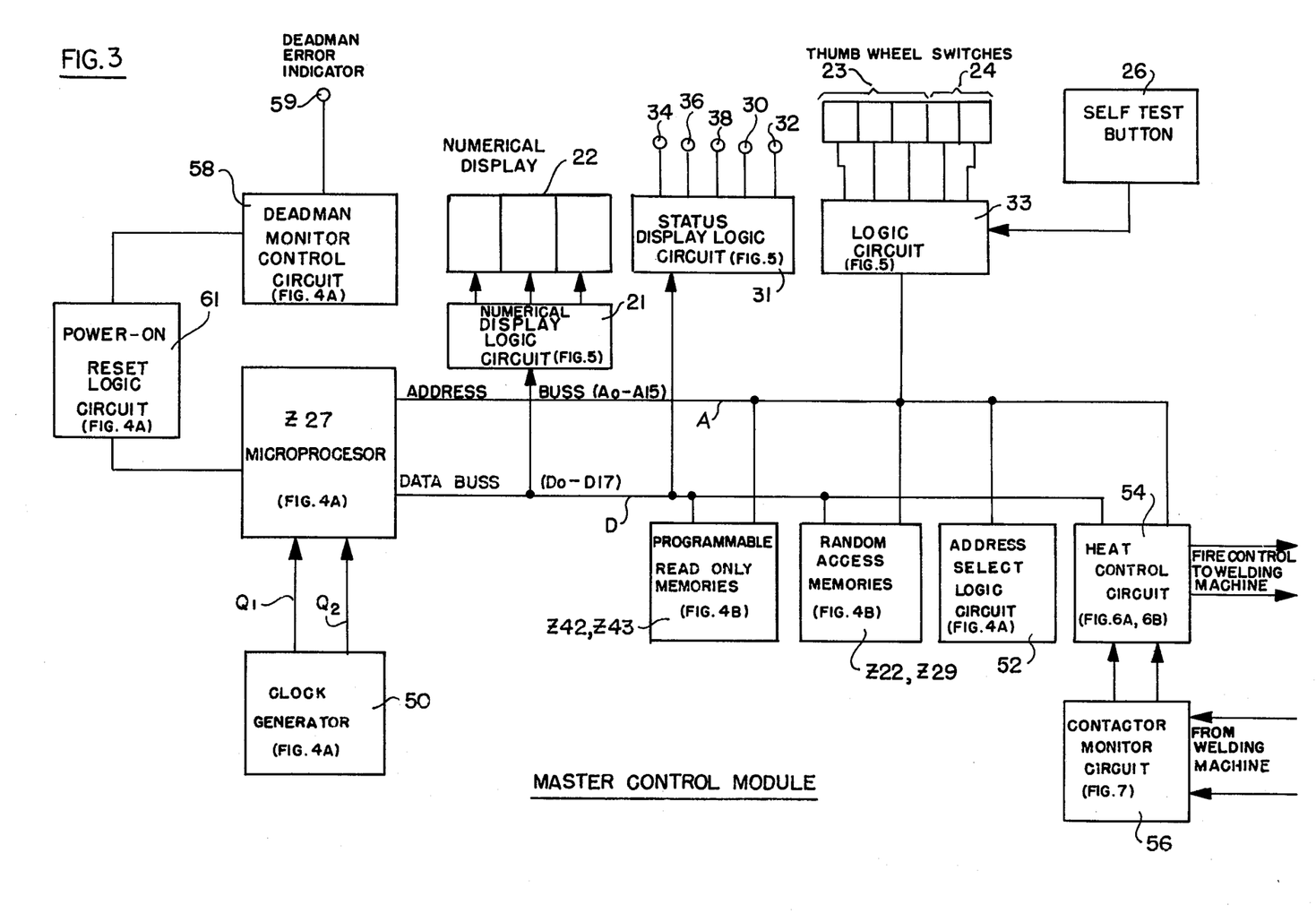
FIG. 3 is a block diagram of the various logic components which are included in the master control module of the controller.

The master control module, as shown in FIG. 3, includes a microprocessor designated Z27 which may be a Motorola 6800 unit. Power-on reset logic circuitry 61 is connected to the microprocessor, as is a clock generator 50. The microprocessor Z27 is connected to an address buss A, and to a data buss D. Two programmable read-only memories Z42 and Z43 are connected across the busses, and these memories store the programs which control the operation of the microprocessor. These memories may be of the type designated 2708, with each memory storing 1024 bytes at eight bits. Two random access memories Z22 and Z29 are also connected across the busses, and these memories store data inputs and data outputs to and from the microprocessor. These latter memories may be of the type designated 2111, and they combine to provide 256 bytes of storage at eight bits. An address select logic circuit 52 is connected to the address buss A, and this circuit develops a number of select signals which are used throughout the controller to select the individual read-only memories Z42, Z43; random access memories Z22, Z29; and other logic elements within the controller.

A heat control circuit 54 controls the firing of the associated welding machine in response to commands from the controller. Contained within the heat control circuit 54 are circuits for line voltage monitoring, phase monitoring (phase lock loop) and power factor control, as will be described. A contactor monitor circuit 56 is also provided for monitoring the operation of the contactor (ignitron or SCR) in the welding circuit of the controlled welder.

A deadman monitor control circuit 58 is provided to detect the condition where the program within the controller has become irrational due to electrical transients, component failure, or other conditions. An error indicator LED 59 is connected to the monitor 58. The normally operating program repeatedly sets the deadman monitor control circuit 59 to its "off" state. However, failure to set the deadman monitor control circuit during any program sequence due to component failure causes the monitor to time out and trigger the reset logic of the microprocessor Z27. This operation restores the program to its "start up" state and permits resumption of the operation of the controller, provided the component failure has been corrected.

The numerical display 22 is controlled by a display logic circuit designated 21. Any number from 0–9 can be posted for each digit in the display to indicate actual line voltage. The status indicator LED's 34, 36 and 38, as well as the status indicator LED's 30 and 32, are controlled by a status display logic circuit 31.

The five thumbwheel switches 23 and 24 for setting desired line voltage and power factor, are connected to a logic circuit 33. Address buss A is connected to the logic circuit 33. The self-test pushbutton switch 26 is also connected to the logic circuit 33. When the self-test pushbutton switch 26 is depressed, the internal program of the system will test sections of the logic within the controller to determine the location of faulty elements. If the diagnostic program is inoperable, an error will be indicated on the test error LED 32 (FIG. 2B). Otherwise, the microprocessor will proceed through the test cycle. Upon a successful completion of the test program, LED 30 of FIG. 2B is energized. Failure of a particular test will be indicated by the LED 32.

Figure 4A:
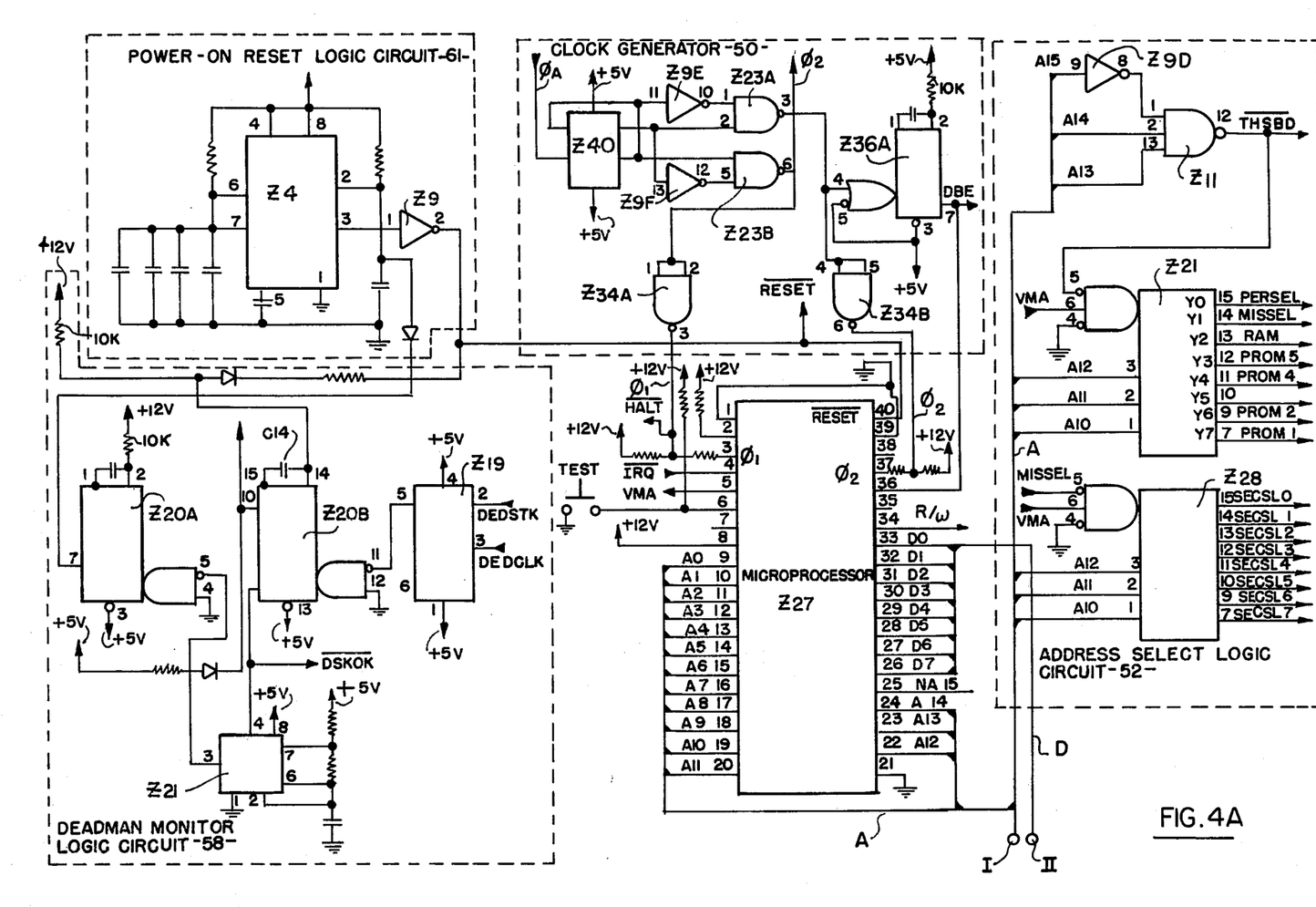
FIGS. 4A, 4B, 5, 6A, 6B, 7 are logic circuit diagrams of the master control module circuitry.

In FIG. 4A, microprocessor 27 includes pins 9–20 which are connected to the address buss A, and which introduce address signals A0–A11 to the address buss. Pins 22–24 are also connected to the address buss A and introduce address signals A12–A14 to the address buss. Pins 26–33 of the microprocessor introduce data signals D0–D7 from the microprocessor to the data buss D.

The address buss A is connected to the programmable read-only memories Z42 and Z43, as illustrated, and also to the random address memories Z22 and Z29, in order that these memories may be selectively addressed by the microprocessor Z27. The data buss D is also connected to the programmable read-only memories and random access memories, as shown, so that program data may be read out of the selected memory locations of the programmable read-only memories, and so that data may be written into or read out of the selected memory locations of the random access memories. The microprocessor generates the signal R/W at pin 34 when it is in its read mode, and this signal becomes $\overline{R/W}$ when the microprocessor is in its write mode.

The address select logic circuit 52 is shown on the right-hand side of FIG. 4A. The logic circuit includes an inverter 29D, a "nand" gate Z11 which may be of the type designated 74LS10, an integrated circuit Z21 which may be of the type designated 741S138, and an integrated circuit Z28 which may also be of the type designated 741S138. Both integrated circuits Z21 and Z28 are activated only when the microprocessor generates the signal VMA at pin 5 to indicate that a valid memory address is being processed.

The integrated circuits Z21, Z28 are decoders which respond to the various BCD address codes from the microprocessor to produce different address select signals at its outputs. The address select signals include signals designated PROM1 and PROM2 for selecting the programmable read-only memories Z42, Z43 of FIG. 4B; PROM 4 and PROM 5 which are used to select programmable memories U27, U28 in the personality module (FIG. 8B); RAM to select the random access memories Z22, Z29 of FIG. 4B, PERSEL which is used to select a circuit in the personality module (FIG. 8C); MISSEL which is used to enable the integrated circuit Z28 so that the integrated circuit may generate the select signals SECSL0–SECSL7 which are used to select the various control and display components of FIG. 3.

The power-on reset circuit 61 and deadman monitor logic circuit 58 are shown on the left of FIG. 4A. The power-on reset logic circuit includes an integrated circuit Z4 which is a timer, and which may be of the type designated 555, whose pin 3 is connected to pin 1 of inverter Z9 which may be of the type designated 74LS04. When power is first turned on, pin 3 of Z4 goes high for about ½ seconds to reset the microprocessor Z27, so that the microprocessor is always reset when power is first turned on. Integrated circuit Z4 is also used to detect power failure. Detection of power failure by Z4 will cause pin 3 of Z4 to go high causing microprocessor to undergo a gradual shut down to its reset condition. The integrated circuit Z4 also serves to delay by about one-half second the signal to pin 40 of the microprocessor after power has been restored, to delay slightly the restart of the microprocessor, similar to its action when power is first turned on.

The deadman monitor logic circuit 58 includes an integrated circuit of the type designated 8602 which provides two astable multivibrators (one shots) designated Z20A and Z20B. Logic circuit 58 also includes an integrated circuit Z19 of the type designated 742S74 in the form of a monostable multivibrator (D-flip-flop). It also includes a timer integrated circuit Z21 which may be of the type designated 555.

Figure 5:
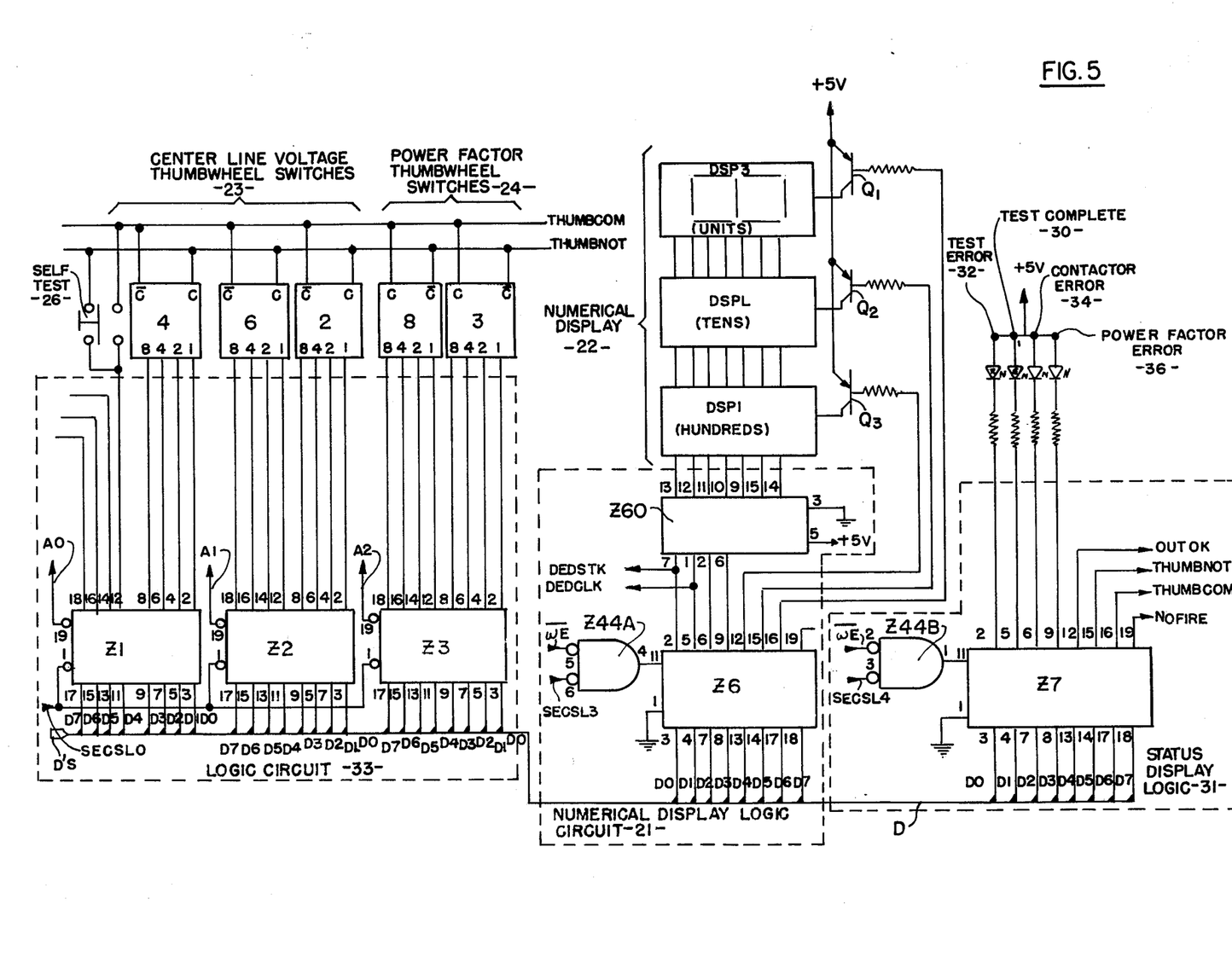

The D-flip-flop Z19 receives the DEDSTK and DEDCLK signals periodically from the microprogram of the controller by way of integrated circuit Z6 (FIG. 5). Failure to receive the signals will cause the integrated circuit Z20 to switch the reset line to the microprocessor pin 40 low. The LED 59 is then illuminated.

When the controller is first turned on, pin 3 of inverter Z9 in the power reset logic circuit 61 goes low for about ½ a second as pin 3 of Z4 goes high, as described above. This causes capacitor C14 across pins 14 and 15 of Z20B to be discharged so as to disable the deadman logic circuit 58 for a short time to permit the controller to become operational. During normal operation the signals DEDSTK and DEDCLK continually trigger the D-flip-flop Z19 so that capacitor C14 remains discharged, and the signal DSKOK to the error indicator LED 59 (FIG. 3) remains low. However, if trouble occurs, the DEDSTK and DEDCLK signals cease, and one-shot Z20B is no longer triggered by flip-flop Z19, capacitor C14 charges, and error LED 59 is energized. In about three seconds thereafter, Z21 times out and triggers one-shot Z20A to cause timer Z4 in the power reset logic circuit to cause the microprocessor to shut down, as described above. If the trouble remains, Z20A is triggered every three seconds to cause the microprocessor to remain in its reset condition. However, if the trouble is corrected, the microprocessor will be automatically permitted to re-start as operation of the deadman logic circuit is resumed and capacitor C14 is discharged. When operation is resumed, C14 is held discharged by Z4 as described above, a sufficient time to permit the microprocessor to become operational and for the signals DEDSTK and DEDCLK again to be generated.

The clock generator 50 includes an integrated circuit Z40 which is connected through inverters Z9A, Z9B, and through "nand" gates Z23A, Z23B to an integrated circuit Z36A, the integrated circuit Z36A may be of the type designated 8602. The "nand" gates Z23A and Z23B are connected to inverters Z34A and Z34B. Z40 is a D-flip-flop which responds to clock pulses φA from a crystal oscillator to perform a ½ frequency division, and to produce clock pulses at 1 MHz. These clock pulses are processed by the logic clemeents Z9E, Z9F, Z23A, Z23B, Z34A and Z34B to produce clock pulses φ1 and φ2 for the microprocessor which never overlap on the positive half cycles, as is required for proper operation of the microprocessor. Z36A is a one-shot which provides 1 MHz Data Buss Enable (DBA) timing pulses for the microprocessor.

Figure 4B:
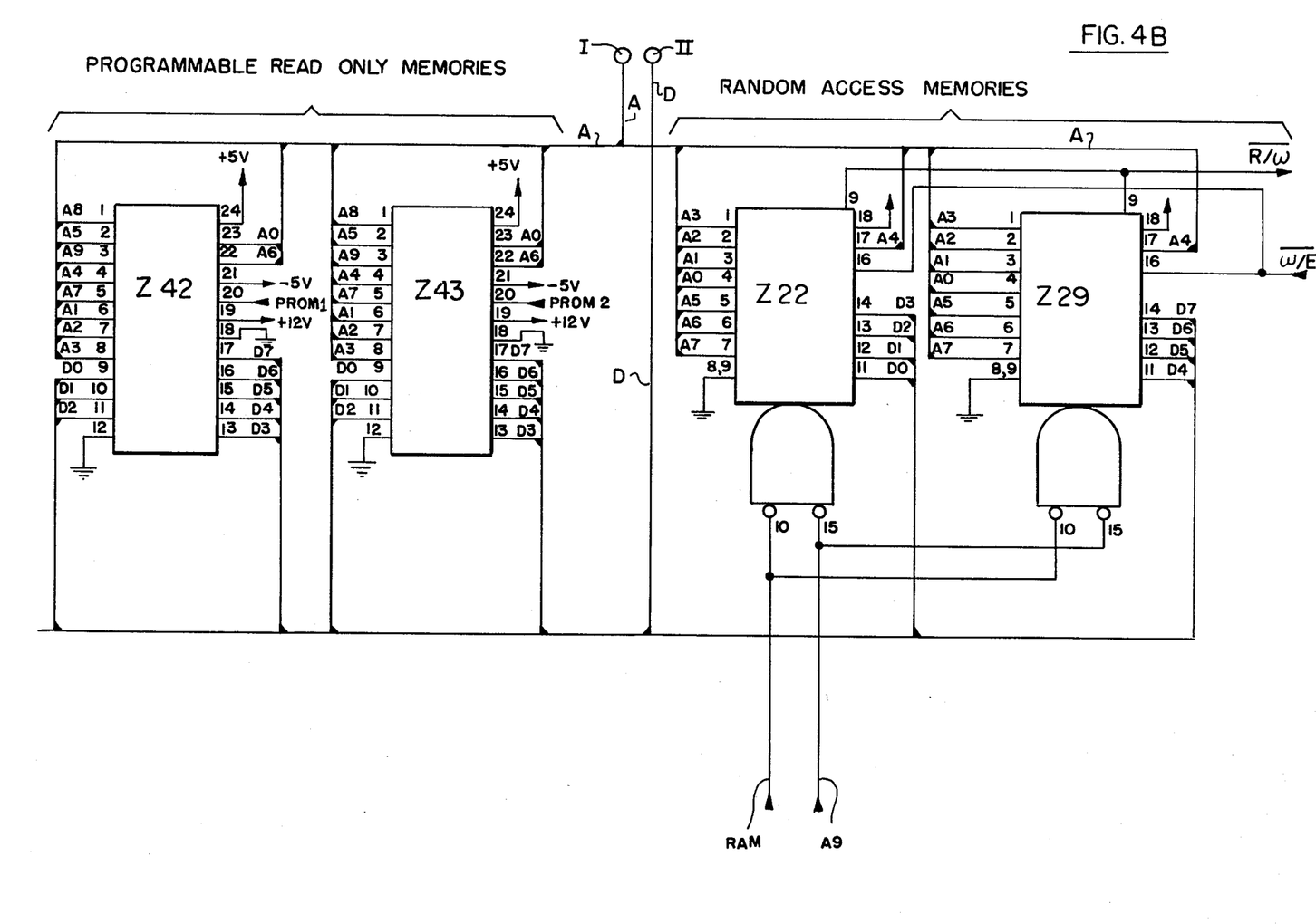

The programmable read-only memories (PROMS) Z42 and Z43 are shown in FIG. 4B, as are the random access memories (RAMS). The PROMS are selected by the PROM1 and PROM2 signals from integrated circuit Z21 in the address select logic circuit 52 of FIG. 4A. The RAMS are selected by the RAM signal from integrated circuit Z21 of the address select logic circuit 52. The RAMS are set to their write mode by the signal R/W from the microprocessor, and to their read mode by the write enable signal W/E from the logic circuit Z41 of FIG. 6B.

The logic circuit 33 which is controlled by the thumbwheel switches 23 and 24, is shown in detail in FIG. 5. This circuit includes three integrated circuits Z1, Z2 and Z3 which may be of the type designated 81LS95. The integrated circuits Z1 and Z2 are encoders which respond to the various settings of the line voltage thumbwheel switches 4, 6 and 2, to produce corresponding BCD data signals on the data buss D; whereas the integrated circuit Z3 is an encoder which responds to settings of the power factor compensator thumbwheel switches 8 and 3 to produce corresponding BCD data signals on the data buss.

The integrated circuits Z1, Z2 and Z3 in logic circuit 33 are selected by the address select signals SECL0 from the integrated circuits Z28 of the address select circuit 52 of FIG. 4A. The individual integrated circuits are selected respectively by the A0, A1 and A2 address signal bits on the address buss A. The integrated circuits Z1 and Z2 are used to scan the status of the three center line voltage thumbwheel switches 4, 6 and 2; and the integrated circuit Z3 is used to scan the status of the power factor thumbwheel switches 8 and 3. Each thumbwheel switch has a four-wire output. The thumbwheel switches are activated by the command signals THUMBCOM, THUMBNOT derived from integrated circuit Z7 in status display logic circuit 31 of FIG. 5. The self-test button 26 also is provided with entry to the system at pin 12 of integrated circuit Z1.

The numerical display logic circuit 21 which controls the line voltage numerical display 22, as shown in FIG. 5, includes an integrated circuit Z6 which may be of the type designated 74LS373. An "and" gate Z44A which may be of the type designated 74LS02 is connected to pin 11 of integrated circuit Z6. The integrated circuit Z6 is connected to the numerical display through a series of PNP transistors Q1, Q2 and Q3, and through an integrated circuit Z60 which may be of the type designated 9374. The status display logic circuit 31, which is connected to the LED's 30, 32, 34, 36, 38 includes integrated circuit Z7 which may be of the type designated 74LS373. An "end" gate Z44B is connected to pin 11 of integrated circuit Z7.

As shown in FIG. 5, the data line D from the microprocessor is connected to the integrated circuits Z1, Z2 and Z3 of logic circuit 33, and also to integrated circuits Z6, Z7 of the numeral display logic circuit 21. The integrated circuit Z6 controls the three units of the numerical display 22, and it also produces the deadman signals DEDSTK and DEDCSK, as shown. The integrated circuit Z7 controls the status indicator LED's, and it also produces the signals OUTOK, THUMBNOT, THUMBCOM and NOFIRE.

The integrated circuits Z6 and Z7 serve to transform data signals on the data buss D into corresponding drive signals for the numerical line voltage display 22, and for the LED's 30, 32, 34, 36. The individual digits in display Z2 are activated by transistors Q1, Q2 and Q3 which, in turn, are selected by integrated circuit Z6. Integrated circuit Z6 is selected by the address select signal SECSL3 from integrated circuit Z28 of the address select circuit 52 of FIG. 4, and integrated circuit Z7 is selected by the address select signal SECSL4 from integrated circuit Z28 of the address select circuit.

Figure 6A:
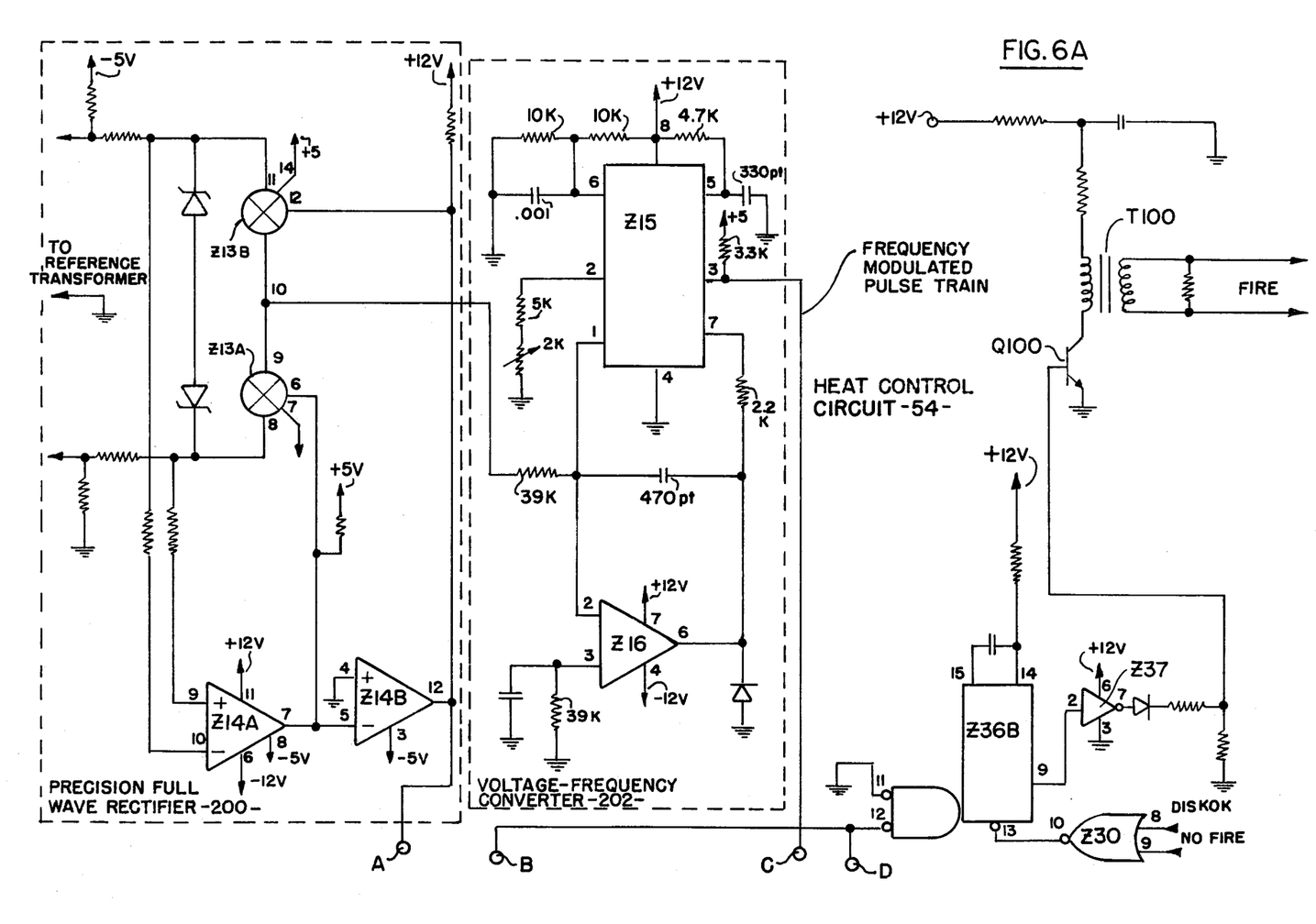
Figure 6B:
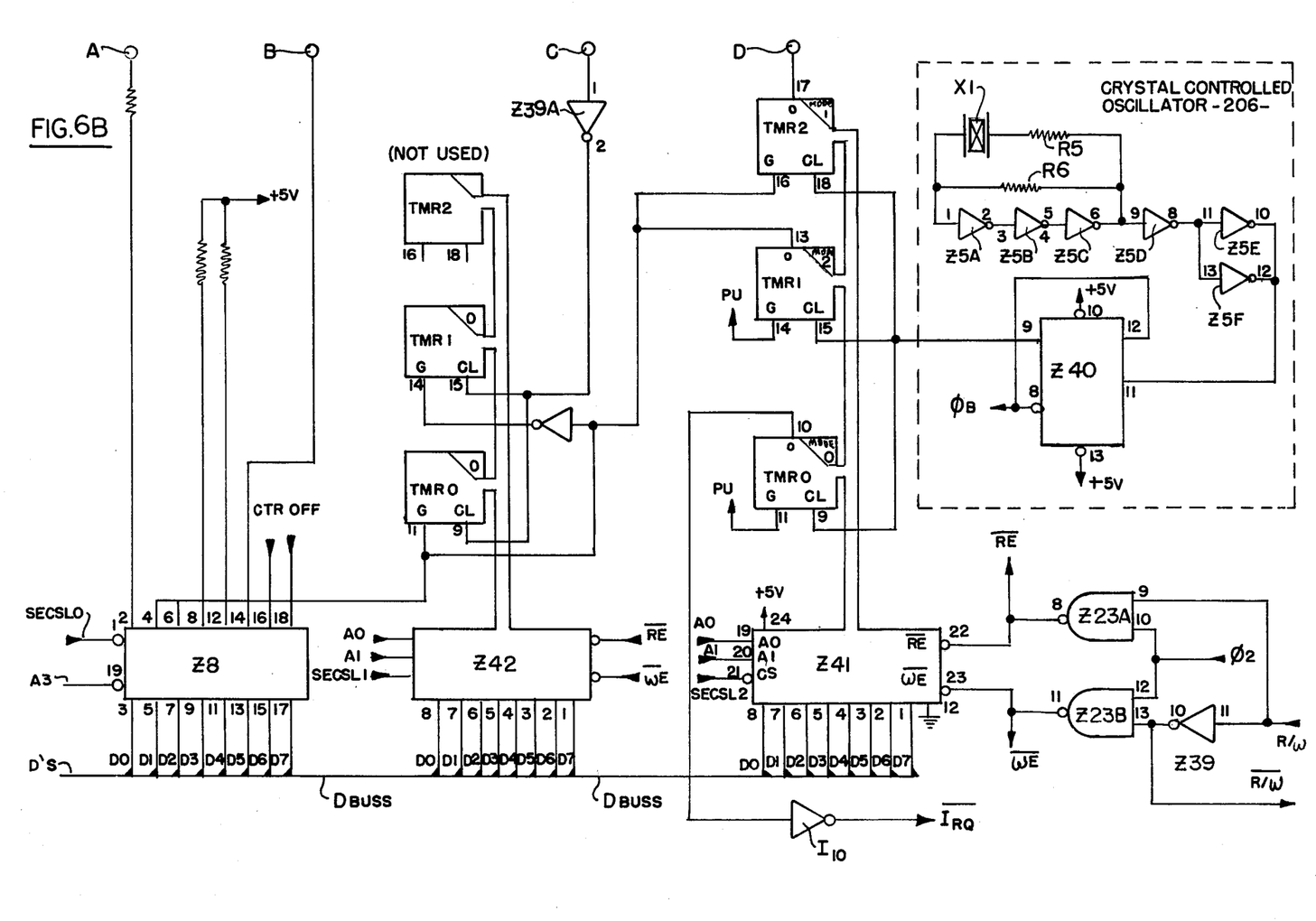

The heat control circuit 54 of FIG. 3 is shown in detail in FIGS. 6A, 6B. This circuit provides precise phase angle power control regardless of changes in line voltage variations or line noise disturbances. The circuit includes two integrated circuit counter/timers Z41, Z42, (FIG. 6B) each of which is an Intel type 8253 programmable chip. These chips each contain a set of three independent counters (TMR0, TMR1, TMR2) which are used as timers by the microprogram for the several functions to be described. All operations of each of the chips Z41, Z42 are programmable. The microprocessor pre-loads the counters TMR0, TMR1, TMR2 of each chip Z41, Z42, using the data buss D. The timer mode is also set by the microprogram during start-up. The timers cause the firing time of the welding operation to change to compensate for line voltage variations and disturbances.

The heat control circuit of FIG. 6A includes a precision full-wave rectifier circuit 200 which is connected to a reference transformer (not shown). The transformer is connected across the leads supplying the line voltage to the controlled welding machine. The rectifier circuit 200 produces a full-wave rectified, unfiltered output to an adjacent voltage-to-frequency converter circuit 202. The converter circuit 202 produces a train of pulses which is frequency modulated by the absolute RMS voltage from the rectifier 200, which in turn, is scaled to the welding line voltage. In the precision full-wave rectifier circuit 200, the elements Z13A, Z13B represent bilateral field effect transistor (FET) switches of the type designated CR4066. The FET switches are connected to the reference transformer. The FET's are controlled by comparators Z14A and Z14B, which are connected as inverters.

The integrated circuit Z8 (FIG. 6B) which may be of the type designated 81CS75, is a tri-state octal buffer which serves as an input port to the microprocessor Z27 (FIG. 4A), and which responds to the signal on the lead connecting the output pin 12 of inverter Z14B in the rectifier 200 (FIG. 6A) to its pin 2 (through connection A) to inform the microprocessor when zero crossings of the line voltage occur. The integrated circuit Z8 is selected by the SECSL0 address select signal and by the address bit A3 on the address buss. The integrated circuits Z41, Z42 are respectively selected by the address select signals SECSL2 and SECSL1, and by the address bits A0 and A1 on the address buss.

A read enable signal $\overline{RE}$ and a write enable signal $\overline{WE}$ are provided for integrated circuits Z41, Z42 by logic gates Z23A, Z23B and inverter Z39 which responds to the R/W signal from the microprocessor.

The integrated circuit Z40 (FIG. 6B) which may be of the type designated 74LS74 is connected as a crystal controlled oscillator 206, the frequency of which is controlled by a crystal X1. The crystal is connected to a 2.2 kilo-ohm resistor R5, and is shunted by a 1 meg-ohm resistor R6. A multiplicity of inverters Z5A-Z5F, formed by integrated circuit Z5 (which may be of the type designated 74CO4), connect the crystal to the integrated circuit Z40. Integrated circuit Z40 is a D-flip-flop which serves to divide the 4.05504 MHz signal generated by the crystal circuit to 2.02752 MHz. The latter signal serves as a clock for the three timers TMR0, TMR1 and TMR2 of integrated circuit Z41. The clock for the timers TMR0 and TMR1 of integrated circuit Z42, is provided by integrated circuit Z15 of the voltage-to-frequency converter 202 of FIG. 6A through inverter Z39A. Inverter Z39A may be of the type designated 74LS04. The input pin 1 of inverter Z39A is connected to pin 3 of integrated circuit Z15 in the voltage-to-frequency converter 202 by way of connection C. Timer TMR0 of integrated circuit Z41 provides for an interrupt mode for the microprocessor. An inverter I10 is connected to pin 10 of the timer, and it produces an interrupt request signal $\overline{IRQ}$ at its output when pin 10 goes high.

The timers TMR0 and TMR1 of the integrated circuit Z42 count the pulses from the voltage-to-frequency converter 202 for alternate quarter cycles. The timer TMR2 of the integrated circuit Z42 is not used.

The timer TMR2 of integrated circuit Z41 is connected to pin 12 of a one-shot Z36B (FIG. 6A) by way of connection D. The one-shot has a pin 9 connected to pin 2 of a power driver Z37. The power driver Z37 drives a power transistor Q100 which, in turn, draws primary current through an isolation transformer T100. The secondary of transformer T100 controls the firing of the contactors (SCR's or ignitrons) in the welding circuit of the controlled welding machine. The timer TMR2 of integrated circuit Z41, in this manner, provides phase-shift firing of the contactors in the welding circuit which is initiated by a square wave from the timer TMR1 of integrated circuit Z41. These timers produce a square wave at twice the frequency of the reference input signal to the voltage-to-frequency converter 202 and is phase locked therewith.

The timer TMR1 of the integrated circuit Z41 produces a 120 Hz square wave which is precisely phase locked with the 60 Hz reference input voltage; the timer being controlled by the 120 Hz crystal oscillator clock from oscillator 206. Phase errors are detected by the difference in counts of the timers TMR1 and TMR0 of integrated circuit Z42.

The timer TMR2 of integrated circuit Z41, as mentioned above, provides a phase angle control for the firing of the contactors in the welding machine, such firing being initiated by the leading edges of a square wave generated by the adjacent timer TMR1 of integrated circuit Z41. The latter timer sets the phase by slightly raising or lowering the frequency of the square wave generated by timer TMR1.

To reiterate, counter TMR2 of integrated circuit Z41 is loaded by the microprocessor with the count at which firing of the welding circuit contactors is to occur. This count corresponds to a predetermined time after each cross-over of the 60 Hz reference line voltage, depending upon the amount of power to be delivered to the welding machine as established by the setting of the controls of the personality module. Firing occurs during each positive half cycle and during each negative half cycle of the 60 Hz reference line voltage. The microprocessor loads a new count into the counter each half cycle of the 60 Hz reference line voltage to maintain constant power to the welding machine despite variations in the line voltage.

The counter TMR1 of integrated circuit Z41 is clocked by the crystal oscillator 206 (as are the counters TMR2 and TMR0 of integrated circuit Z41) and is phase locked to the 60 Hz reference line voltage so that it generates a 120 Hz square wave which is phase locked with the 60 Hz reference line voltage so that the leading edge of each cycle of the square wave corresponds to the crossover point of the 60 Hz reference line voltage. The leading edge of each cycle of the square wave determines when the adjacent counter TMR2 is to start counting. The counter TMR1 is in effect a programmable frequency divider which divides the clock derived from the crystal oscillator 206 by an integer N. The integer N is controlled to vary slightly from cycle to cycle of the 60 Hz reference voltage to change the frequency of the square wave slightly to maintain it in phase with the cross-over points despite changes in the actual phase angle of the reference voltage due to noise disturbances and load changes.

The microprocessor gets information concerning the phase and voltage of the 60 Hz reference line voltage from integrated circuit Z42. Counter TMR1 of integrated circuit Z42 counts the pulses from the voltageto-frequency converter 202 of FIG. 6A during the first quarter of each half cycle of the 60 Hz reference line voltage; and counter TMR0 counts the pulses during the second quarter of each half cycle. These counters in effect perform a digital integration of the area of each half cycle, and the count of each counter corresponds to the area of the corresponding quarter wave. The counts of the two counters are then summed for each half cycle to determine whether there are any variations in the voltage of the 60 Hz reference voltage, and the counts are subtracted to determine whether there are any changes in the phase of the 60 Hz reference line voltage.

Any indicated changes in voltage of the 60 Hz reference line voltage cause the count loaded into counter TMR2 of integrated circuit Z41 to be changed; and any change in the phase of the reference voltage causes the frequency of the square wave generated by counter TMR1 to change, so that constant power may be maintained to the welding machine for each cycle of the reference line voltage despite variations in voltage or phase.

Due to the fact that counters TMR1 and TMR0 of integrated circuit Z42 perform an integrating function, it wll be seen that noise or other disturbances which are not repetitive and which would not affect the power delivered to any appreciable extent, are not detected and the system is unresponsive to such noise or other non-repetitive disturbances.

The heat control circuit of FIGS. 6A and 6B is of the same general type as is described in U.S. Pat. No. 3,452,214, which issued June 24, 1969; in that the power delivered to the welding machine is controlled by a phase angle control whereby selected percentages of each half cycle of an energizing sine wave is passed to the welding machine, depending upon the amount of power desired for a particular weld. Like the system of the patent, the heat control circuit includes a counter and a series of pulses of considerably higher frequency than the frequency of the sine wave is passed into the counter. Initiation of the counter is effected in synchronism with a particular phase angle of the sine wave, i.e., the cross-over point, and a control pulse is derived from the counter after a certain number of pulses have been counted. The control pulse is used to operate the contactors in the energizing circuit of the welding machine, so as to pass a particular fraction of each half cycle of the sine wave to the load, the fraction being a function of the number of pulses counted which, in turn, are established by the amount of power to be delivered to the welder. However, unlike the control system of the patent, the heat control system of the present invention, as described above, incorporates simple and inexpensive means to maintain a desired phase angle relationship between the firing time of the contactors in the energizing circuit to the welding machine and the line voltage, despite disturbances in the line voltage.

One of the more important features of the control effectuated by the integrated circuits Z41 and Z42 of FIG. 6B is their line noise rejection capability. The integrated circuit Z15 of the voltage-to-frequency converter 202 of FIG. 6A, which drives the timers TMR1 and TMR0 of integrated circuit Z42 forms a digital integrating system which has the effect of reducing, or integrating out, short term noise occurrences and phase variations in the line power which may be caused, for example, by starting up heavy motors or by unusual load changes. Specifically, it is important to consider the integrated circuits Z15 and Z42 as digital integrators which free the system from noise associated with a single cycle of line input. In other words, zero crossing noise, or noise on the peaks of the input line power is integrated out by these circuits, if it is non-repetitive. This feature assures the most stable possible output power to the controlled welding machine under all conditions of line noise and line voltage changes.

Figure 7:
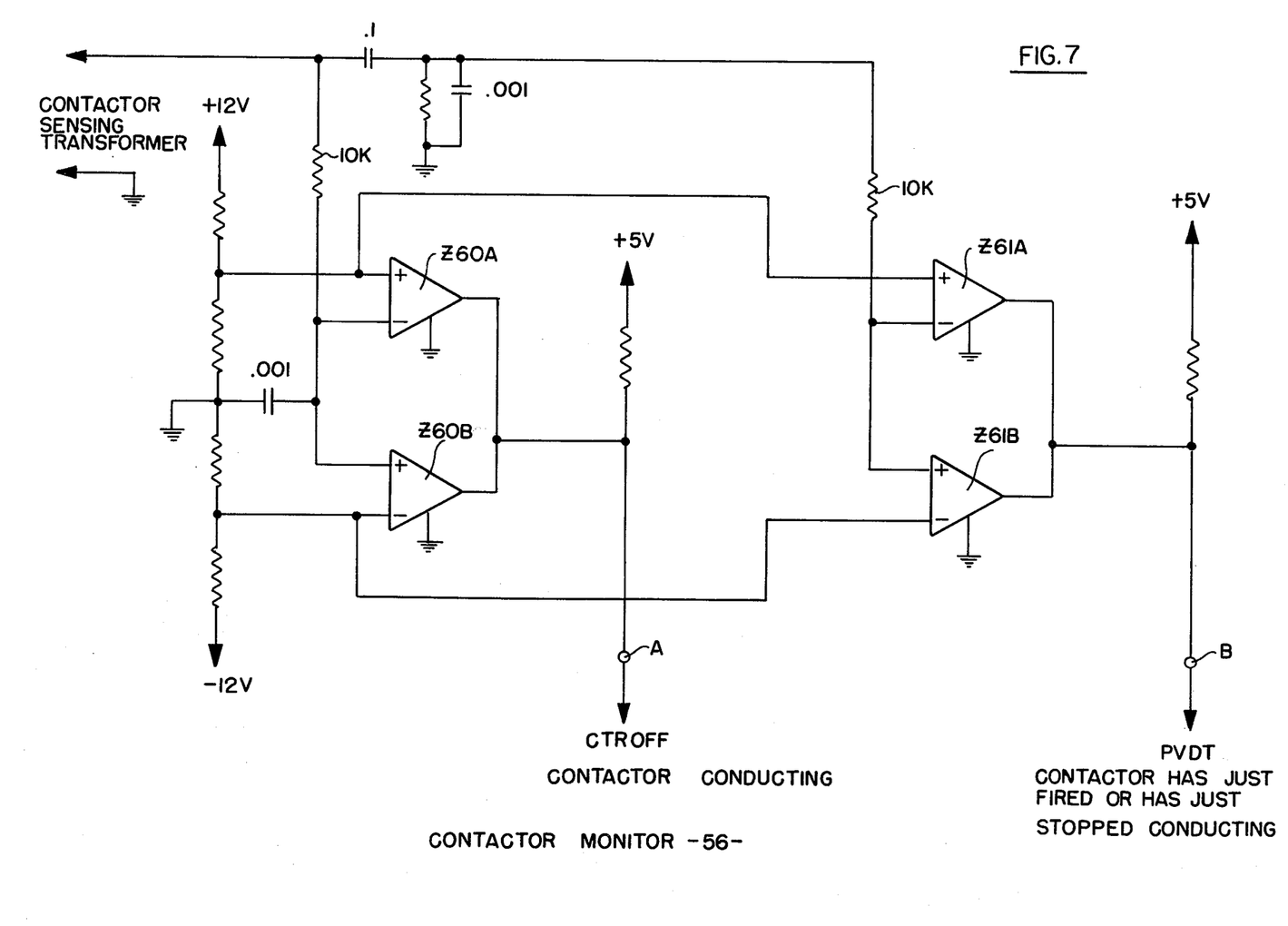

The circuitry of the contactor monitor circuit 56 of FIG. 3 is shown in FIG. 7. The circuit of FIG. 7 is used during the self-test operation, and its purpose is to monitor the contactors of the welding circuit of the controlled welding machine, which contactors may be either SCR's or ignitrons, as mentioned above. The circuit of FIG. 7 includes two comparators Z760A and Z760B which form an integrated circuit of the type designated LM319; and the circuit also includes two additional comparators Z61A and Z61B which also form an integrated circuit of the type designated LM319.

The input to the circuit of FIG. 7 is connected to the secondary of a contactor sensing transformer (not shown). The circuit of FIG. 7 includes an output terminal A, and the signal (CTROFF) at that output terminal is high at any time the voltage across the secondary of the contactor sensing transformer indicates that the contactor is conductive. The circuit of FIG. 7 also includes an output terminal B, and the signal appearing at output terminal B (DVDT) is high each time the contactor changes from a conducting to a non-conducting state, and vice versa. If the contactor is malfunctioning, the signals at the output terminals A and B are sensed by the microcomputer which in turn illuminates the power factor error light 36 or the contactor error light 34 of FIG. 2B.

Figure 8A:
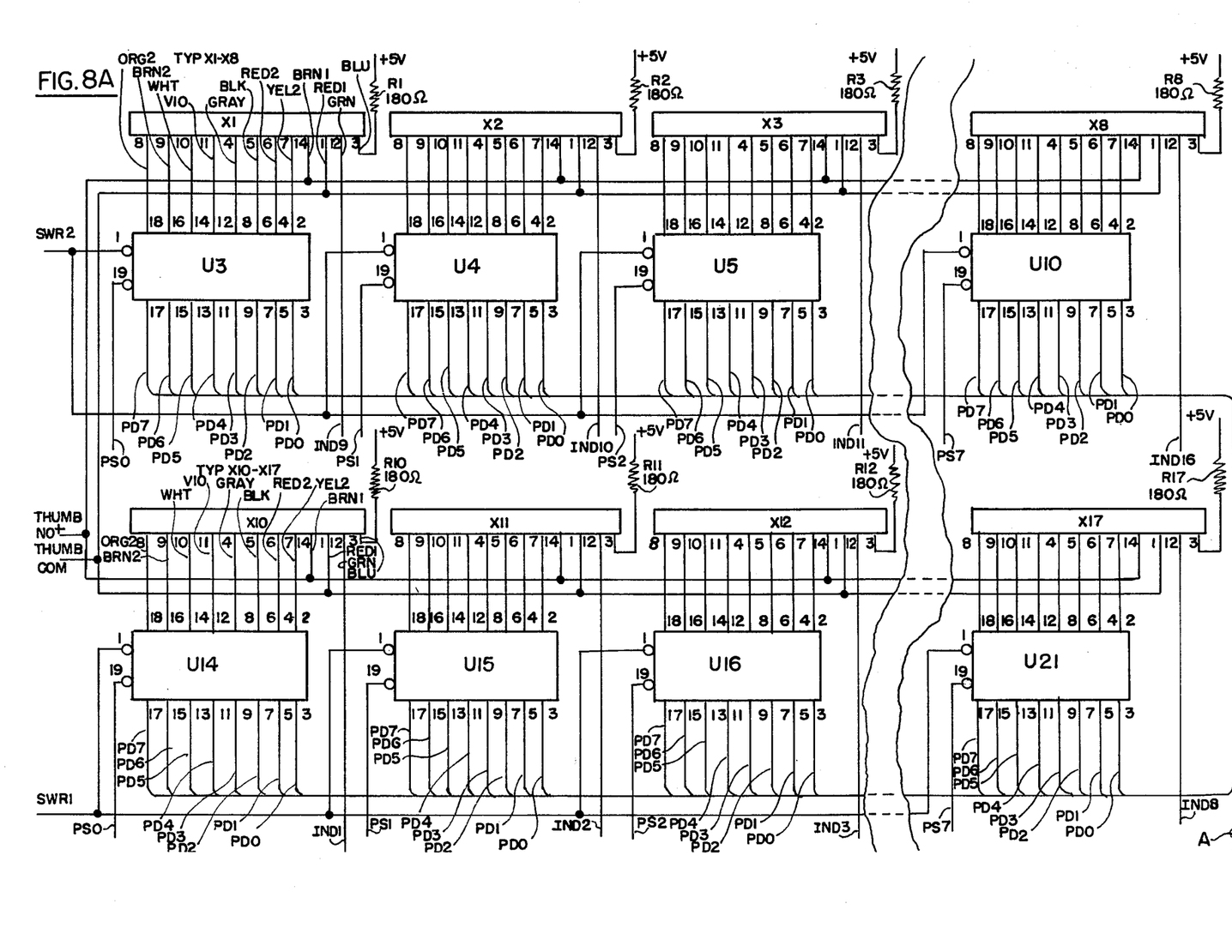
FIGS. 8A-8D are logic circuit diagrams of the circuitry of a typical general purpose personality module.
Figures 8B, 8C, 8D:
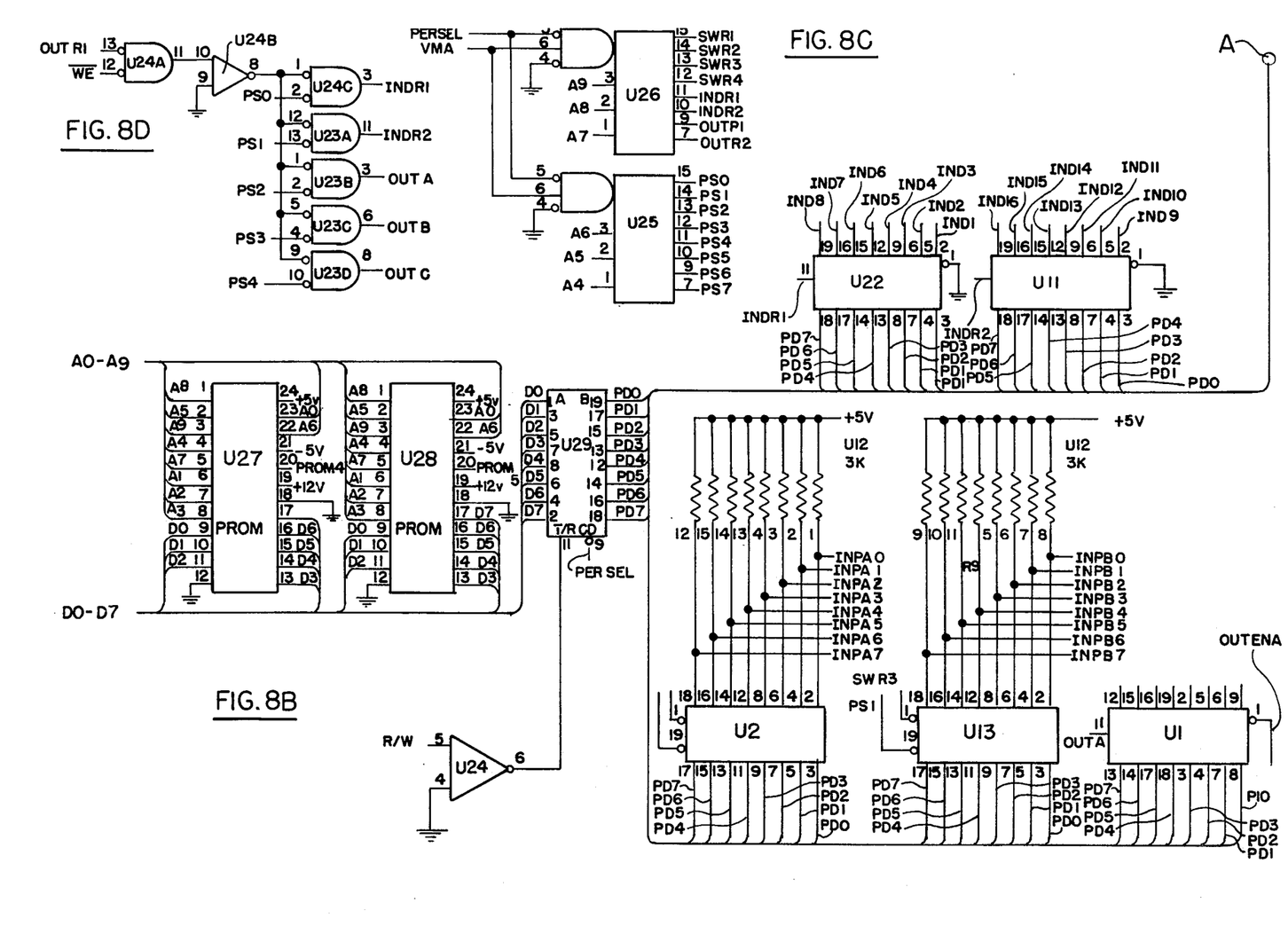

The circuit of the personality module 20 of FIGS. 2A and 2B is shown in FIGS. 8A-8D. The purpose of the personality module is to permit a diversity of controls to be tailored to a particular user with a minimum amount of hardware change. In other words, the personality module provides a means to tailor the control of the overall system for a particular user principally by software changes rather than by hardware changes. The personality module circuit of FIG. 8A provides sockets X1-X8, X10-X16 for plugging in corresponding pairs of thumbwheel switches, such as the switch pairs #1-#9 shown in FIGS. 2A and 2B. The sockets actually provide a means for plugging from one to sixteen pairs of thumbwheel switches into the module, although only nine pairs are used in the embodiment of FIGS. 2A and 2B. The function of each pair of thumbwheel switches is first specified by the users, and this function is defined, not by hardware, but by software which is programmed into a pair of programmable read-only memories (PROMS) U27, U28 shown in FIG. 8B. These PROMS may be of the type designated 2708. As an example, a squeeze-weld-hold-off control which is the minimum control system in the welding industry would use a switch pair #1 plugged into socket X1 for "squeeze"; a switch pair #2 plugged into socket X2 for "weld"; a switch pair #3 plugged into socket X3 for "hold"; and a switch pair #4 plugged into socket X4 for "off". Such a control system would not use any of the other sockets; and the programmed read-only memories U27, U28 would be programmed so that the desired functions may be provided when the switch pairs #1-#4 are operated.

The integrated circuits U3-U21 of FIG. 8A are tri-state input ports of the type designated 81LS95. These integrated circuits convert the settings of the various thumbwheel switch pairs plugged into sockets X1–X8, X10–X16 into two digit binary coded decimal numbers. Signals corresponding to the two digit binary coded decimal numbers are multiplexed on the data buss, as the integrated circuits U3–U21 are selectively addressed by the microprocessor.

The integrated circuit U29 of FIG. 8B is an octal buss transceiver which effectively isolates the heavy loads associated with the large amount of logic in the personality module from the driving circuits of the master control module 18. This integrated circuit may be of the type designated 8304. The integrated circuit U11 and U22 of FIG. 8B are octal latches which are used to illuminate corresponding LED's associated with the thumbwheel switch pairs plugged into sockets X1–X8, X10–X16 of the personality module as the integrated circuits U3–U21 of FIG. 8A corresponding to the various switch pairs are selected by the microprocessor. For example, if the switch pair plugged into socket X1 of FIG. 8A establishes the "squeeze" time, then pin 2 of integrated circuit U11 of FIG. 8B (IND9) would be high to light the corresponding LED during the squeeze time. These indications provide the operator with positive verification that the system is performing each particular function at the proper time.

Integrated circuits U2, U13 of FIG. 8B are tri-state input ports, and may be of the type designated 81LS95, and they serve to convert analog inputs into corresponding binary coded signals. These integrated circuits are wired to various input devices such as dual initiation switches which involve first and second stage initiation of the control system; contact gages; limit switches; emergency stop switches; and the like. Again, the function of any particular input provided by integrated circuits U2, U13 is defined by what has been programmed into the PROMS U27, U28. Thus, the overall system of the personality module is a general purpose building block which allows easy customization of the control of the users requirement.

The integrated circuit U1 is an octal latch, and it is used to drive solid state output relays which serve to turn on air valves, water valves, and the like, again according to the users specification. Integrated circuit U1 may be of the type designated 74LS373. The integrated circuit responds to data on the data lines, which are heavily multiplexed, and latches at certain times selectively to drive one or more of the aforesaid output devices in response to the appropriate commands.

The integrated circuits U25 and U26 of FIG. 8C are three-line to eight-line decoder-multiplexers. These integrated circuits are used partially to decode address lines 4 through 9 in response to the PERSEL personality module select command and a valid memory address. These integrated circuits serve to develop a unique address for each of the integrated circuits U3–U21 of FIG. 8A, and for each of the input/output integrated circuits U21, U11, U13, U2 and U1 of FIG. 8B. These integrated circuits may be of the type designated 74LS138.

The "nor" gates U23A–U23D, and U24A, U24B of FIG. 8D serve partially to decode the output lines of the integrated circuits U25 and U26 of FIG. 8C to allow the integrated circuits U22, U11 and U1 of FIG. 8B to be uniquely selected. The outputs OUTB and OUTC are not used in the illustrated system. The integrated circuits U24A and U24B and U23A-U23D may be of the type designated 74LS02.

The invention provides, therefore, a control system for a resistance welding machine, or the like, which is precise in its operation, and which may be readily tailored to a large number of different user requirements.

It will be appreciated that although a particular embodiment of the control system of the present invention has been illustrated and described, modifications may be made. It is intended in the claims to cover the modifications which come within the spirit and scope of the invention.

What is claimed is:

1. A heat control system for controlling a resistance type welding machine, or the like, comprising: a full-wave rectifier circuit connected to an alternating current reference line voltage source to produce a full-wave rectified unfiltered output; voltage-to-frequency converter connected to the full-wave rectifier circuit to produce a train of pulses frequency modulated by the output of the full-wave rectifier circuit; integrated circuit means, including programmable counter means connected to said converter for delivering phase angle power control to the welding machine in the presence of line voltage variations and noise disturbances, said programmable counter means including first counter means connected to said voltage-to-frequency converter and responsive to the frequency modulated pulses therefrom for performing a digital integration for each half cycle of the reference line voltage, said first counter means including a first counter for performing a digital integration of the first half of each half cycle of the reference line voltage and a second counter for performing a digital integration of the second half of each half cycle of the reference line voltage and a third counter for producing a firing signal to the welding machine each time the third counter reaches a predetermined count and a fourth counter for initiating the count in the, third counter; means for establishing said predetermined count in said third counter; circuit means for maintaining the output of the fourth counter phase locked with the reference voltage; and control means responsive to the sum of the counts of the first and second counters for each half cycle of the reference line voltage for controlling the predetermined count in said third counter at which the firing signal is produced.

2. The system defined in claim 1, and which includes control means responsive to the difference in counts of the first and second counters for controlling the firing of the fourth counter to maintain the initiation of the count in the third counter at the cross-over points of the alternating current reference line voltage.

3. The system defined in claim 1, and which includes crystal controlled oscillator means connected to the third and fourth counters for introducing clock signals thereto.

* * * * *